United States Patent [19]

Koskowich et al.

[11] Patent Number: 5,861,719
[45] Date of Patent: Jan. 19, 1999

[54] REGULATED POWER SUPPLIES FOR ELECTROLUMINESCENT LAMPS

[75] Inventors: Gregory N. Koskowich, Pleasanton, Calif.; Paul W. Latham, II, Lee, N.H.

[73] Assignee: IMP, Inc., San Jose, Calif.

[21] Appl. No.: 878,165

[22] Filed: Jun. 18, 1997

[51] Int. Cl.[6] .............................. H05B 37/02; H02M 7/44
[52] U.S. Cl. .......................................... 315/209 R; 363/98
[58] Field of Search ............................... 363/16, 17, 97, 363/98, 131, 132; 323/222; 315/128, 169.3, 209 R, 308, DIG. 5, DIG. 7

[56] References Cited

U.S. PATENT DOCUMENTS

| | | |
|---|---|---|
| 4,210,848 | 7/1980 | Suzuki et al. . |
| 4,277,728 | 7/1981 | Stevens . |
| 4,443,741 | 4/1984 | Tanaka et al. . |
| 4,449,075 | 5/1984 | D'Onofrio et al. . |
| 4,527,096 | 7/1985 | Kindlmann . |
| 4,769,753 | 9/1988 | Knudson et al. . |
| 4,937,477 | 6/1990 | Tsoi et al. . |
| 4,982,314 | 1/1991 | Miki . |
| 5,068,570 | 11/1991 | Oda et al. ................................ 315/128 |
| 5,142,203 | 8/1992 | Oda et al. . |
| 5,306,954 | 4/1994 | Chan et al. . |
| 5,313,141 | 5/1994 | Kimball . |
| 5,347,198 | 9/1994 | Kimball . |
| 5,349,269 | 9/1994 | Kimball . |
| 5,397,928 | 3/1995 | Chan et al. . |
| 5,412,544 | 5/1995 | Derrick et al. . |
| 5,418,434 | 5/1995 | Kamens et al. . |
| 5,463,283 | 10/1995 | Sanderson . |
| 5,475,285 | 12/1995 | Konopka . |
| 5,483,503 | 1/1996 | Kimball . |
| 5,493,183 | 2/1996 | Kimball . |
| 5,495,404 | 2/1996 | Stephens . |
| 5,502,357 | 3/1996 | Kimball . |
| 5,508,585 | 4/1996 | Butt . |
| 5,514,935 | 5/1996 | Oda et al. ................................ 315/82 |
| 5,525,869 | 6/1996 | Wood . |
| 5,530,318 | 6/1996 | Ensign, Jr. et al. . |
| 5,539,707 | 7/1996 | Wood . |
| 5,557,175 | 9/1996 | Wood . |
| 5,686,797 | 11/1997 | Sanderson ................................ 315/209 R |

FOREIGN PATENT DOCUMENTS

0730392A2  9/1996  European Pat. Off. .

OTHER PUBLICATIONS

Article, "SP4422A Electroluminescent Lamp Driver," *Sipex*, SP4422A TG062096–00, pp. 1–8.

Booklet entitled: "Durel Electroluminescent System," *Durel Corporation*, pp. 1–20, (1995).

BKL, Inc. Pamphlets entitled: "BKL Performance Graphs—Aviation Green N3," front/back pages (Sep. 1993); BKL Performance Graphs—Aviation Green P4 High Voltage, (White P4 High Voltage) to Aviation Green P4 Low Voltage, four pages (Mar. 1994); BKL Inverters, front/back pages (Jul. 20, 1995); BKL Electroluminescent Lamp and Inverter Systems, pp. 1–3 (Jul. 20, 1995); BKL Performance Graphs, —Green KHA High Voltage, front/back pages (Aug. 1996); and BKL E1 Panel and Inverter System Performance, one page (Sep. 1996).

Insert from Supertex, Inc. (HV803) Pamphlet entitled: "High–Voltage EL Lamp Driver," pp. 10–12 of 14 (published date unknown but prior to Jan. 1, 1997).

*Primary Examiner*—Matthew Nguyen
*Attorney, Agent, or Firm*—Majestic, Parsons, Siebert & Hsue

[57] ABSTRACT

A power supply for a capacitive load, such as an electroluminescent lamp, converts a low battery voltage to a significantly higher voltage of alternating polarity to drive the load. A desired voltage waveform is applied to the load by accumulating charge in its inherent capacitance from voltage spikes resulting from rapidly disconnecting an inductor from the battery. The maximum voltage applied to the load is maintained below a maximum by a feedback loop that monitors a reduced voltage by use of a voltage divider. The voltage divider is formed of a plurality of capacitors connected in series, the reduced voltage being monitored across one of them. The entire power supply is formed on a single integrated circuit chip, except for the inductor, battery and load.

14 Claims, 3 Drawing Sheets

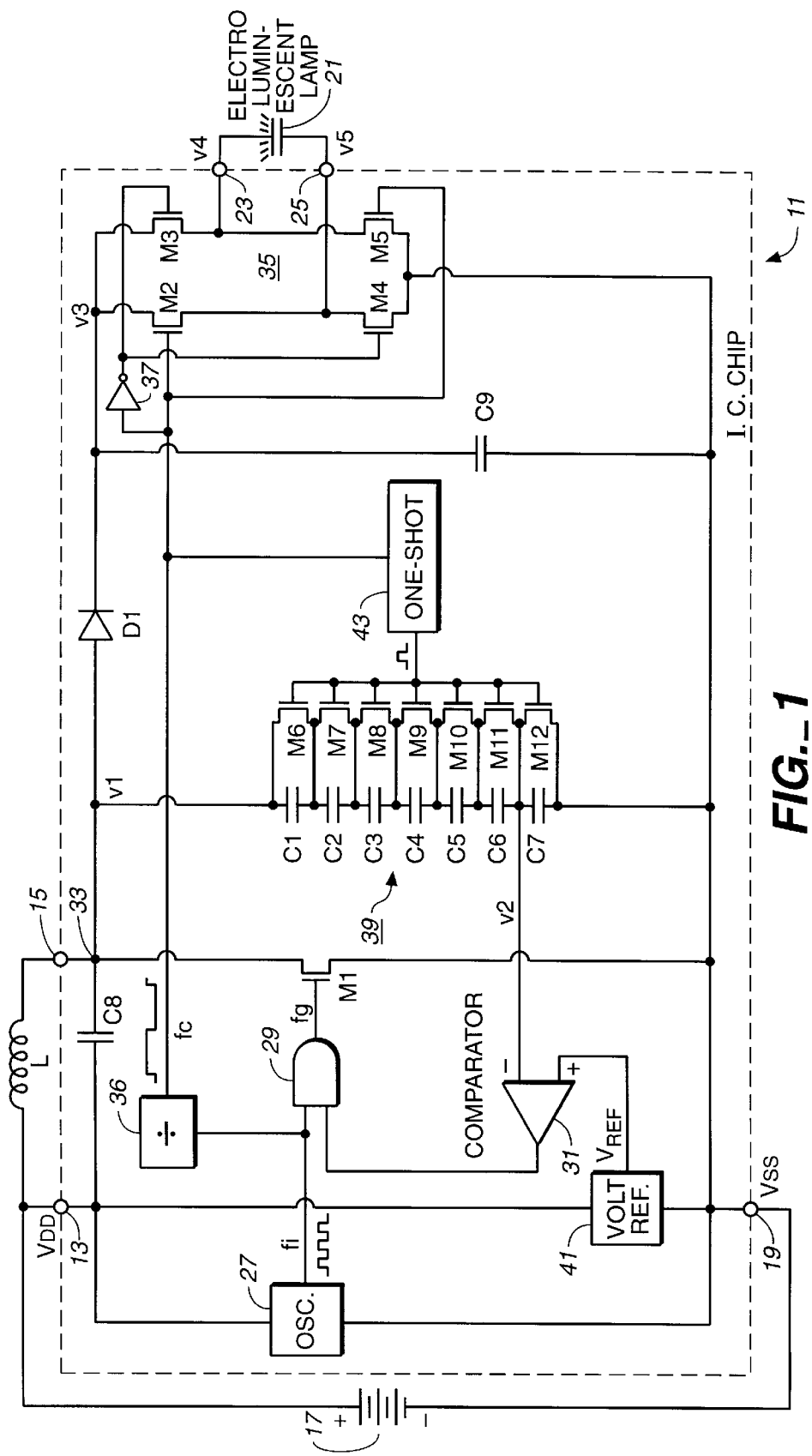
FIG._1

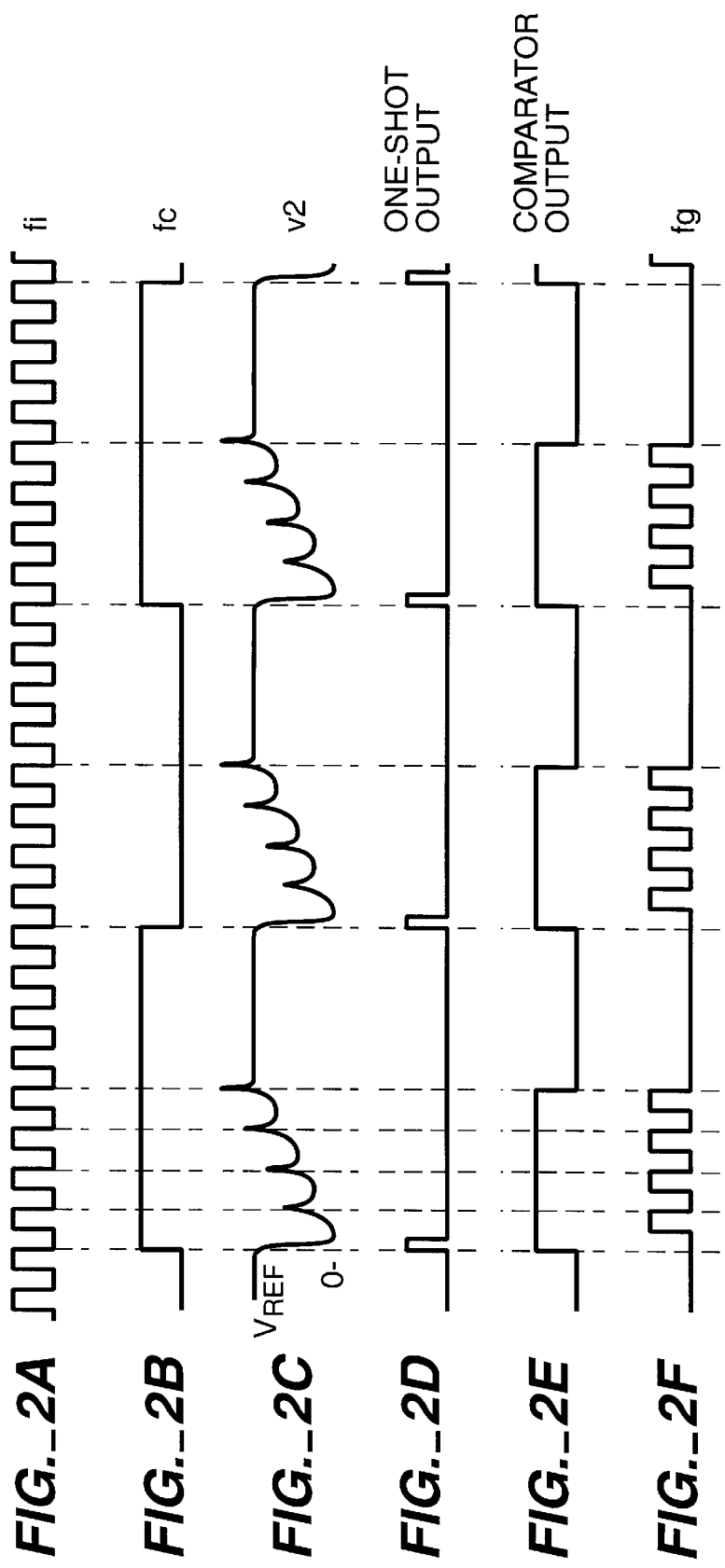

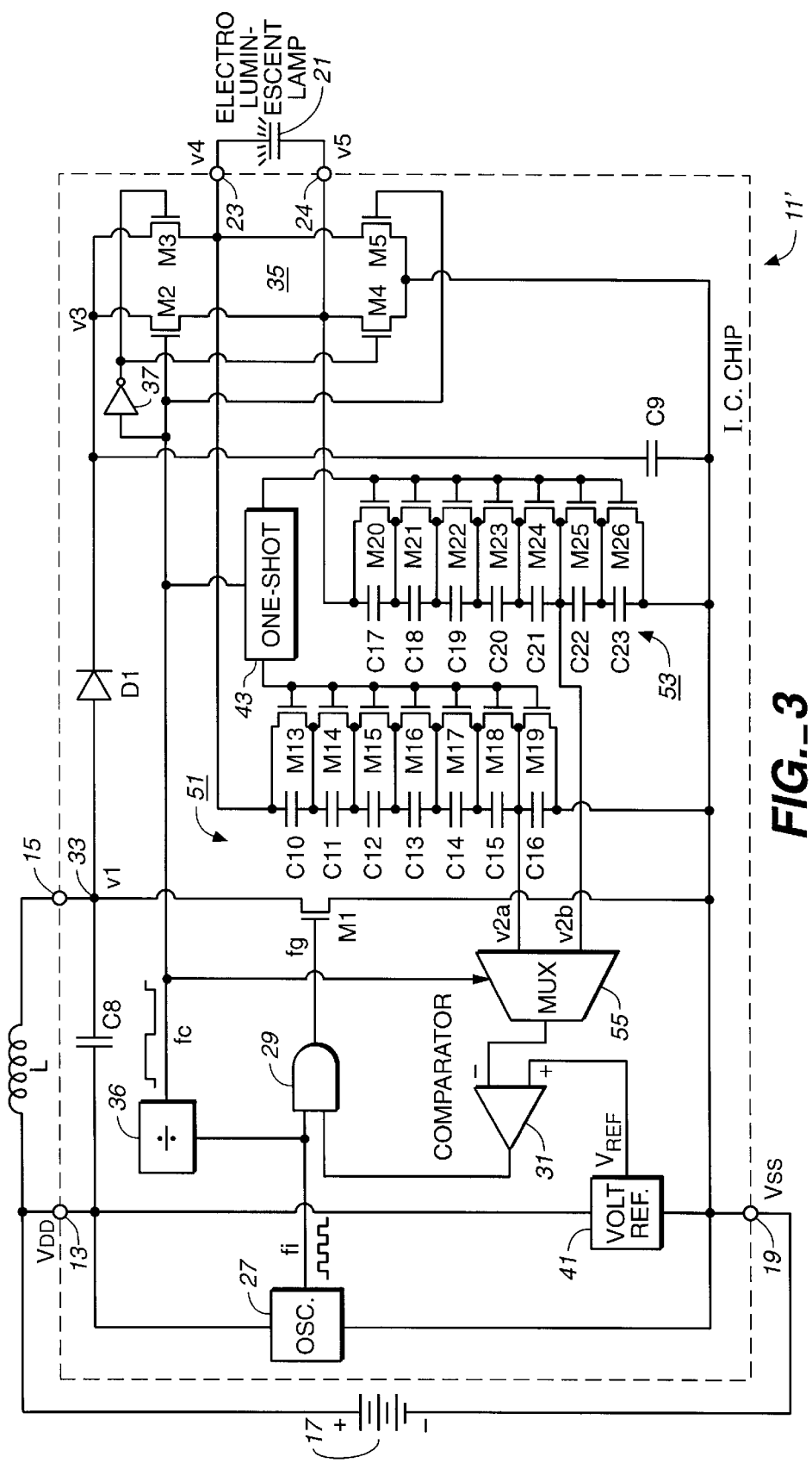
FIG._3

REGULATED POWER SUPPLIES FOR ELECTROLUMINESCENT LAMPS

BACKGROUND OF THE INVENTION

This invention relates generally to power supplies and voltage converters, and, in a specific implementation, to circuits that drive electroluminescent lamps with a high alternating polarity voltage from a low voltage battery supply.

A type of electroluminescent lamp that is widely used in numerous applications is a thin structure formed of a layer of electroluminescent material sandwiched between two conductive electrode layers. One of the electrodes is optically transparent to the resulting luminescence. When a sufficiently high voltage is applied across the two electrodes, a resulting electric field causes the intermediate electroluminescent layer to emit light that is visible through the transparent electrode. The brightness of the emission depends upon the magnitude of the voltage applied. Very little current is consumed in the process. The polarity of the supply voltage is alternated at a sufficiently high rate to prevent a build up of charge that causes the intensity of the luminescence to significantly diminish. A power supply especially designed for driving electroluminescent lamps is generally used.

Applications of this type of lamp include the back lighting of portable electronic devices such as watches, telephones, pagers, and the like. Such lamps are also used in automobile dashboards to provide back lighting of various displays. Included among other applications are displays where the lamps are either shaped or masked to form some symbol, letter or number. In most applications, the power supply to the lamp is required to convert a low direct current battery voltage, such as 1.5, 3.0 or 12 volts, into a voltage across the electrodes of the lamp that is 100 volts or more, and having an alternating polarity. A frequency in a range of about 100–1000 Hz. is generally used. Too high a frequency diminishes the life of the lamp and too low a frequency causes visible flicker.

A typical electroluminescent lamp driver uses the fact that this type of lamp has the electrical characteristics of a capacitor. An inductor is connected to a low voltage battery through a transistor switch. This switch is repetitively turned on, to store energy from the battery in the inductor, and then quickly and sharply turned off to generate a high voltage spike or pulse. A series of such pulses applied to the lamp causes a charge to build up in its equivalent capacitor and thus increase the voltage across its electrodes. The high voltage causes the lamp's electroluminescent material dielectric to emit light. The polarity of the charge accumulation in the lamp capacitor is periodically reversed by alternating the polarity of the voltage applied to the lamp, through use of a bridge switching circuit or the like.

It is a primary object of the present invention to provide such a power supply for electroluminescent lamps that regulates and controls the maximum voltage that results from the accumulated charge.

It is another object of the present invention to provide such a voltage controlled power supply that itself consumes little power, thus extending battery life.

It is a further object of the present invention to provide such a power supply on a single integrated circuit chip with only the battery and inductor outside of the circuit chip.

It is a more general object of the present invention to provide an integrated circuit voltage converting techniques of a general application.

SUMMARY OF THE INVENTION

These and additional objects are accomplished by the present invention, wherein, briefly and generally, according to one aspect embodied in an electroluminescent lamp driver, a voltage proportional to the build up of charge across the inherent capacitance of the lamp, resulting from switched inductor voltage pulses being applied to the lamp, is monitored. Application of voltage pulses to the lamp is terminated when that monitored voltage reaches a predetermined magnitude, this being accomplished in a preferred form by ceasing to switch the inductor. Voltage pulses are again applied to the lamp after their polarity is switched, preferably by commencing the switching of the inductor. This limiting circuit technique protects integrated circuit elements and components from the damage that can result from an excessive voltage being applied internally on a circuit chip. The brightness of the electroluminescent lamp emission is also maintained more uniform.

An appropriate voltage within the driver circuit, either that applied to the lamp or some other related voltage, is monitored by a non-resistive voltage divider formed of multiple capacitors on the integrated circuit chip and connected in series across the voltage. The voltages generated in the driving circuit are then maintained within desired operating ranges of integrated circuit components and the lamp itself, without need for the extensive integrated circuit chip space, increased power consumption and heat that result when a voltage divider of resistors is used. A voltage control circuit, formed of standard circuit components, receives a voltage drop across one of the capacitors that is proportional to the voltage being monitored. Multiple additional capacitors are preferably included as part of the voltage divider. The voltage drop across each of the capacitors is then small, and this allows each of the capacitors to be formed with a thin dielectric by standard processing techniques. The amount of chip space consumed by such a voltage divider is very small.

According to another aspect of the present invention, the potential of electromagnetic interference resulting from the on chip switching circuits is minimized. In a preferred form, capacitors are formed on the chip and connected across both the switched inductor and the polarity switching bridge.

Additional objects, features and advantages of the various aspects of the present invention are included in the following description of its preferred embodiments, which description should be taken in conjunction with the accompanying drawings.

BRIEF DESCRIPTION OF THE DRAWINGS

FIG. 1 is a circuit diagram of a first embodiment of the present invention;

FIG. 2A–F show voltage waveforms at various nodes of the circuit of FIG. 1; and

FIG. 3 is a circuit diagram of a second embodiment of the present invention.

DESCRIPTION OF THE PREFERRED EMBODIMENTS

Referring to the circuit diagram embodiment of FIG. 1, nearly all of the power supply converter is contained on an integrated circuit chip 11. Only an inductor L is required off-chip, being connected to the chip at terminals 13 and 15. A battery 17, also provided off-chip, is connected to the chip at terminals 13 (positive d.c. supply voltage $V_{DD}$) and 19 (negative d.c. supply voltage $V_{SS}$). A load in the form of an electroluminescent lamp 21 of the type described above, which exhibits a significant capacitance across its two terminals, is connected to terminals 23 and 25 of the chip 11. The circuit chip 11 and external inductor L convert a low d.c. battery voltage, such as 1.5, 3.0 or 12.0 volts, across the chip's input terminals 13 and 19, into a much higher voltage at the chip's output terminals 23 and 25, such as 100 volts or more, with a relative polarity that alternates therebetween.

The input battery voltage is initially increased by alternately connecting and rapidly disconnecting the inductor L from the battery 17. This is accomplished by a field effect transistor M1 connected between one side of the inductor L and the supply voltage $V_{SS}$. The transistor M1 is turned on and off by a clock signal $f_g$ (FIG. 2F) applied to its gate. The clock signal $f_g$ originates from an output $f_i$ (FIG. 2A) of an oscillator 27. Alternatively, the clock signal $f_i$ could be supplied from outside the chip 11 through another terminal. In order to obtain the signal $f_g$, the signal $f_i$ is selectively blocked by an AND-gate 29 having as inputs the clock signal $f_i$ and an output of a comparator 31, to be explained below. In response to the transistor M1 being turned off, at each trailing edge of the clock signal pulses $f_g$, a voltage spike occurs at a circuit node 33 that is much higher that the voltage across the battery 17.

It is these voltage spikes at the circuit node 33 that causes charge to be accumulated in the inherent capacitance of the lamp 21. The node 33 is connected by a diode D1 to the lamp 21 through an H-bridge circuit 35 connected across an inductively spiked voltage v3 and the reference voltage $V_{SS}$ with the lamp terminals 23 and 25 connected in its middle. The H-bridge alternates the polarity of the voltage v3 applied across the lamp 21 in response to a second clock signal $f_c$ (FIG. 2B). The clock signal $f_c$ is derived from a divider 36 connected to receive the clock signal $f_i$. The H-bridge 35 includes transistors M2 and M5 that are turned on and off by the clock signal $f_c$, and transistors M3 and M4 that are switched by an inverted form of the clock $f_c$, obtained from an inverter 37. As the charge in the lamp capacitance from the inductive voltage spikes accumulates in one polarity, the voltage across the lamp 21 continues to increase. When the polarity across the lamp is switched, its inherent capacitance is discharged and the voltage build-up in the opposite polarity begins.

The voltage across the capacitance is not allowed by the circuit of FIG. 1 to build up to whatever level it can achieve for the number of trailing edges of the clock signal $f_i$ that occur during each one-half period of the clock $f_c$. This number would be equal to a ratio of $f_c/f_i$ if some further control is not imposed. In order to better control, the voltage rise across the lamp terminals 23 and 25, or a related voltage within the power supply, is monitored within the power supply of FIG. 1 by a closed loop system that maintains the monitored voltage below a desired maximum.

In the embodiment of FIG. 1, the internal voltage v1 is monitored by a capacitive voltage divider 39 connected between the node 33 and the supply potential $V_{SS}$. The voltage divider 39 is formed of a number, in this case seven, capacitors C1–C7 connected in series. A voltage v2 (FIG. 2C) across the capacitor C7 is applied to an inverting input of the comparator 31. A non-inverting input of the comparator 31 receives a reference voltage $V_{REF}$ from a voltage reference source 41 connected across the supply voltages $V_{DD}$ and $V_{SS}$. When the voltage v2 is less than $V_{REF}$, the output of the comparator 31 (FIG. 2E) is high and thus causes the AND-gate 29 to apply the clock signal $f_i$ to the gate of the transistor M1 as signal $f_g$ (FIG. 2F). Conversely, when the voltage v2 exceeds $V_{REF}$, the output of the comparator 31 goes low, with the result of the AND-gate 29 blocking the clock signal $f_i$ from reaching the transistor M1. During the interval when the transistor M1 is not being switched by an absence of the clock signal $f_g$, no inductive voltage spikes are generated and the build up of the voltage v1 is maintained below a maximum value that is $V_{REF}$ multiplied by some constant. That constant depends upon the relative capacitance of the voltage divider capacitors C1–C7. In the specific example being described, this constant is a ratio of the sum of the values of the capacitances C1–C6, divided by the value of the capacitor C7.

The voltage divider 39 could alternatively be implemented with just two series connected capacitors, a relatively small capacitor C7 and another much larger capacitor in place of capacitors C1–C6. These relative values are dictated by this circuit where the maximum voltage of v1 is in the neighborhood of 100 volts for an electroluminescent lamp load, and a maximum voltage $V_{REF}$ that the comparator 31 wants to see across the capacitor C7 is only a few volts, such as 3.0 or 5.0 volts, that is typical of current integrated circuit implementations. A difficulty in using only two capacitors is that the one capacitor in place of C1–C6 would need to have many times the area of the capacitor C7, and its dielectric layer would need to be much thicker in order to withstand the higher voltage. Therefore, the use of multiple individual capacitors, C1–C6 being shown as an example, instead of just one, is generally preferable since this form of voltage divider 39 is easier to implement with standard integrated circuit techniques.

The capacitors of the voltage divider 39 are periodically discharged simultaneously with the H-bridge 35 changing the polarity of the voltage being applied across the lamp 21. In the implementation shown, each of the capacitors C1–C7 has connected across it one of switching transistors M6–M12. The gates of all the transistors M6–M12 are connected to an output of an edge triggered one-shot multivibrator 43. The one-shot 43 emits a short pulse (FIG. 2D) at each edge of its input signal, which is the clock signal $f_c$. Thus, at each of both positive and negative going edges of the clock signal $f_c$, all of the capacitors C1–C7 are discharged. After discharge, they are then in a condition to operate during a new cycle of being charged by the inductive voltage spikes applied across the voltage divider C1–C7.

As an alternative to the use of switching transistors M6–M12, a number of diodes may be used. Each such diode is connected between individual ones of the capacitors and the reference potential $V_{SS}$ in a manner to be reversed biased by the inductive voltage spikes being generated, so as not to be conducting then, while discharging the individual capacitors when such voltage drops at the end of each such spike below the thresholds of the individual diodes.

Two additional capacitors C8 and C9 are employed to reduce any electromagnetic interference (emi) that might result from use of the power supply. The capacitor C8 is connected across the inductor L and sized to provide a low impedance short circuit to very high frequencies that can be generated from alternately connecting the inductor L to and disconnecting the inductor L from the battery 17. Similarly, the capacitor C9 is connected across the H-bridge 35 to suppress any such very high frequency components that might result from alternately connecting the voltage v3 to the lamp terminals 23 and 25.

Another embodiment is shown in FIG. 3, wherein much of the circuit on a chip 11' is the same as that of the chip 11 in the embodiment of FIG. 1, common elements being given the same reference numbers. The difference is in the feedback maximum voltage control. Instead of monitoring the voltage v1, lamp voltages v4 and v5 are monitored by separate capacitive voltage dividers 51 and 53 that are individually substantially the same as the voltage divider 39 of the FIG. 1 embodiment. The voltage dividers 51 and 53 generate reduced voltages v2a and v2b across their capacitors C16 and C23, respectively. A multiplexer 55 connects one of the voltages v2a or v2b to the inverting input of the comparator, in response to the clock signal $f_c$. While the H-bridge 35 is connecting the lamp terminal 23 to the voltage v3 and the terminal 25 to $V_{SS}$, the multiplexer 55 connects the voltage v2a of the divider 51 to the comparator 31. Conversely, while the H-bridge 35 is connecting the lamp terminal 25 to the voltage v3 and the terminal 23 to $V_{SS}$, the multiplexer 55 connects the voltage v2b of the divider 53 to the comparator 31.

In yet another embodiment, the voltages at the lamp terminals 23 and 25 are monitored with use of a single capacitive voltage divider. This is done by locating the multiplexer ahead of the voltage divider in a manner to alternately connect the single voltage divider to the voltages v4 or v5, depending upon which one is receiving the voltage v3. An advantage of this other embodiment is that only one voltage divider is required, but a disadvantage is that the multiplexer needs to withstand the high voltages of the lamp output. In the embodiment of FIG. 3, the multiplexer 55 operates at the low voltage of the comparator 31.

Although the present invention has been described with respect to its preferred embodiments, it will be understood that the invention is entitled to protection within the full scope of the appended claims.

It is claimed:

1. On an integrated circuit chip having terminals adapted to be connected with an external battery, inductor and electroluminescent lamp, a circuit providing an operating voltage to the lamp from the battery, comprising:

means responsive to a clock signal of a first frequency for alternately connecting and disconnecting the inductor to the battery terminals in a manner to generate voltage pulses having a magnitude significantly higher than a voltage output of said battery, means receiving said voltage pulses and responsive to a clock signal of a second frequency for applying said voltage pulses to the lamp with a polarity that alternates with said second frequency, said second frequency being a fraction of the first frequency, a voltage divider formed of a first capacitor and a plurality of additional capacitors all connected in series to receive said voltage pulses thereacross, and means receiving a voltage drop across said first capacitor for turning off said inductor connecting and disconnecting means in response to the voltage drop across the first capacitor exceeding a predetermined magnitude.

2. The circuit of claim 1, wherein said voltage divider is connected to an inductor terminal.

3. The circuit of claim 1, wherein said voltage divider is connected to at least one of two lamp terminals.

4. The circuit of claim 1, wherein said voltage divider is connected to one of two lamp terminals.

5. The circuit of claim 4, wherein the circuit additionally comprises:

a second voltage divider formed of a second capacitor and a second plurality of additional capacitors all connected in series to another of said two lamp terminals, and means receiving a voltage drop across said second capacitor for turning off said inductor connecting and disconnecting means in response to the voltage drop across the second capacitor exceeding said predetermined magnitude.

6. The circuit of any one of claims 1–5, additionally comprising an individual switching transistor connected to individual ones of the voltage divider capacitors in a manner to short out the capacitors when the transistor is rendered conductive, and means for periodically rendering the switching transistors conductive for intervals occurring at said second frequency.

7. A power supply that provides an operating voltage to an electroluminescent lamp from a battery, comprising:

an inductor, a first circuit that alternately connects and disconnects the inductor to the battery in a manner to generate voltage pulses having a magnitude significantly higher that a voltage output of said battery, a second circuit that applies said voltage pulses to the lamp with an alternate polarity, a third circuit including a voltage divider formed of a plurality of capacitors connected in series to sense an effect of the voltage pulses within the power supply, and a fourth circuit that turns off said first circuit in response to said divided voltage exceeding a predetermined magnitude.

8. The power supply of claim 7, wherein the plurality of capacitors of said third circuit are connected directly to the inductor.

9. The power supply of claim 7, wherein the plurality of capacitors of said third circuit are connected directly to the lamp.

10. An integrated circuit for supplying from a battery to an electroluminescent lamp an operating voltage that is significantly higher than a voltage of the battery, comprising:

means adapted to receive the battery voltage for generating the operating voltage to the lamp in a form of an increasing voltage waveform alternating between two polarities, a voltage divider formed of a first capacitor and a plurality of additional capacitors connected in series to receive said increasing voltage waveform thereacross, and means receiving a voltage drop across said first capacitor for limiting a magnitude of the increasing voltage waveform in both of the two polarities.

11. A method of providing an alternating polarity voltage to a load having an inherent capacitance, comprising:

alternately connecting and disconnecting an inductor to a battery in a manner to generate a series of voltage pulses with a magnitude significantly in excess of a voltage output of the battery, applying a series of the voltage pulses to the load in each of two polarities in sequence in a manner to accumulate charge in said inherent load capacitance with an alternating polarity, applying across a plurality of series connected capacitors a voltage resulting from the accumulated charge and monitoring a divided charge voltage therefrom, and terminating application of the voltage pulses of one polarity to the load upon each occurrence of the monitored divided charge voltage reaching a given magnitude and restarting application of the voltage pulses to the load upon each occurrence of the polarity of the voltage pulses being switched.

12. A power supply that provides an increased voltage from a d.c. voltage source to an output, comprising:

an inductor, a first circuit that alternately connects and disconnects the inductor to the source in a manner to generate voltage pulses having a magnitude significantly higher than the voltage of said source, a second circuit that is responsive to the generated voltage pulses to provide the increased voltage to the output, a third circuit including a voltage divider formed of a plurality of capacitors connected in series to sense an effect of the voltage pulses within the power supply, and a fourth circuit that turns off said first circuit in response to said divided voltage exceeding a predetermined magnitude.

13. The power supply of claim 12, wherein the plurality of capacitors of said third circuit are connected directly to the inductor.

14. The power supply of claim 12, wherein the plurality of capacitors of said third circuit are connected directly to the output.

* * * * *